Figure 1:
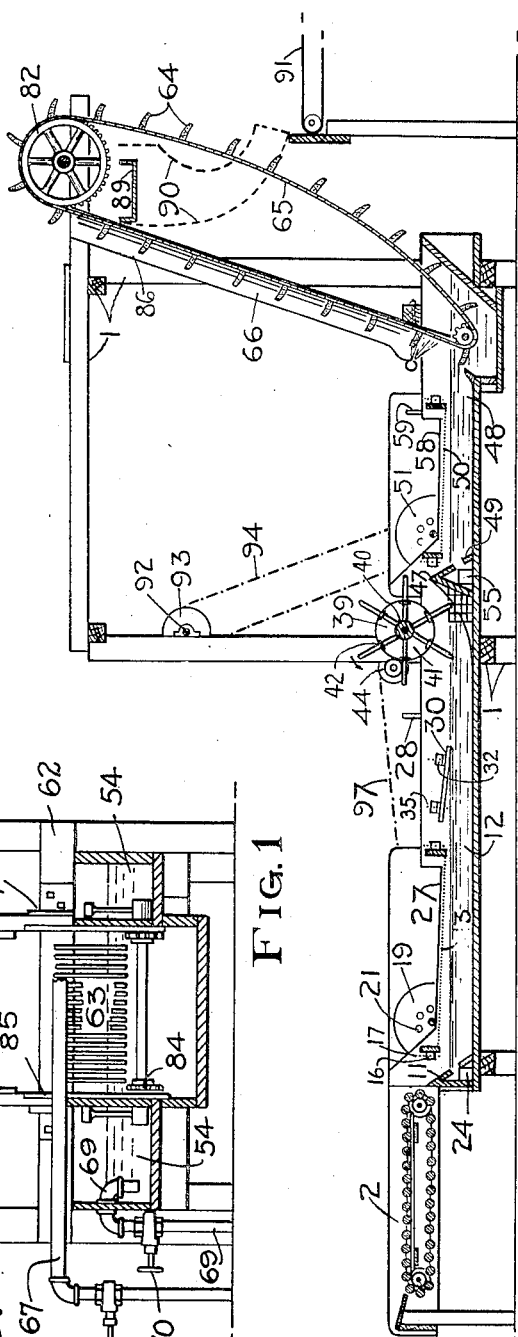

Aug. 22, 1933.　　　G. E. GOODWIN　　　1,923,722

FRUIT CLEANING MACHINE

Filed April 1, 1929　　　2 Sheets-Sheet 1

INVENTOR
George E. Goodwin

Aug. 22, 1933.  G. E. GOODWIN  1,923,722
FRUIT CLEANING MACHINE
Filed April 1, 1929  2 Sheets-Sheet 2

INVENTOR
George E. Goodwin

Patented Aug. 22, 1933

1,923,722

UNITED STATES PATENT OFFICE 1,923,722

FRUIT CLEANING MACHINE

George E. Goodwin, Hood River, Oreg.

Application April 1, 1929. Serial No. 351,674

7 Claims. (Cl. 146—194)

The invention pertains to a fruit cleaning machine of the surge tank, float and duct return type of liquid washer and rinser and is designed to wash and rinse apples, pears, peaches, oranges, lemons, or other similar types and forms of fruit where such cleaning may be necessary on account of the removal of spray, dust, or other foreign matter from the surface of such fruit; or for the purpose of giving such fruit a liquid sanitary, disinfectant or prophylactic treatment.

The primary object of the invention is to provide a fruit cleaning machine which will wash the fruit at less expense, and better, than the machines heretofore used for that purpose, the washing being affected in a cleansing liquid like a weak solution of hydrochloric acid, or some suitable solvent solution; and rinsing in a liquid as clear water or some prophylactic solution.

The principal features of the invention (supplemental to suitable tanks containing the liquid solutions, into which the fruit is placed,) consist of liquid lifting and circulating wheels by which the liquid is caused to splash over the fruit and by means of diffusing screens to drench it, (by which agitation of the liquids the chemical action of the solvent agents of the cleansing solution is made more effective) and to surge the liquid through the tanks, and force the floating fruit under the submergers, turning same over in the liquid, by which methods it is thoroughly washed or rinsed as by the strong circulating currents of the liquids it is floated to the place where it is removed from the tanks. The circulation of the liquids is effected by the liquid lifting and circulating wheels drawing the liquid in a return direction through a duct or ducts. The transferring of the fruit from one tank into another is accomplished by means of rake wheels; and the removal of the fruit from the rinsing tanks by a conveyor.

With these enumerated objects in view and the general method just outlined, the invention consists of novel features of construction and of combination of parts and operations, many of which are not set forth in the appending claims and form of embodiment hereinafter shown or referred to in the drawings which accompany and form a part of these specifications and description, which are written as pertaining to a fruit cleaning machine having single level tandem tanks each equipped with two splay boards, two liquid circulating and lifting wheels, and two ducts, with regulating devices, for the return of the liquids and an elevating conveyor; but which are equally applicable and susceptible to embodiment in machines having tanks in various positions, and having a different number or various kinds and positions of liquid return ducts, splay boards and liquid lifting and circulating wheels, all of which are susceptible of modifications and combinations almost unlimited, and it is understood that changes in the proportion or size or minor changes in form or arrangement may be made without affecting the spirit or advantages of the invention.

Figure 2:
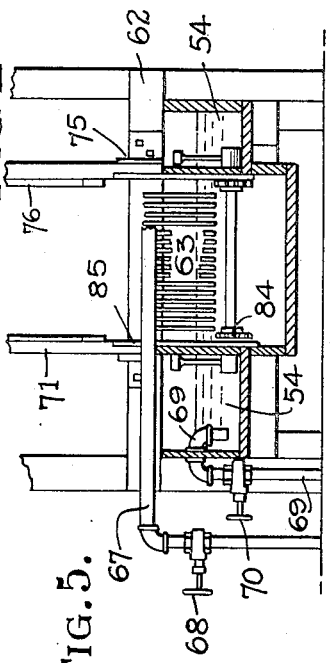
Figure 5:
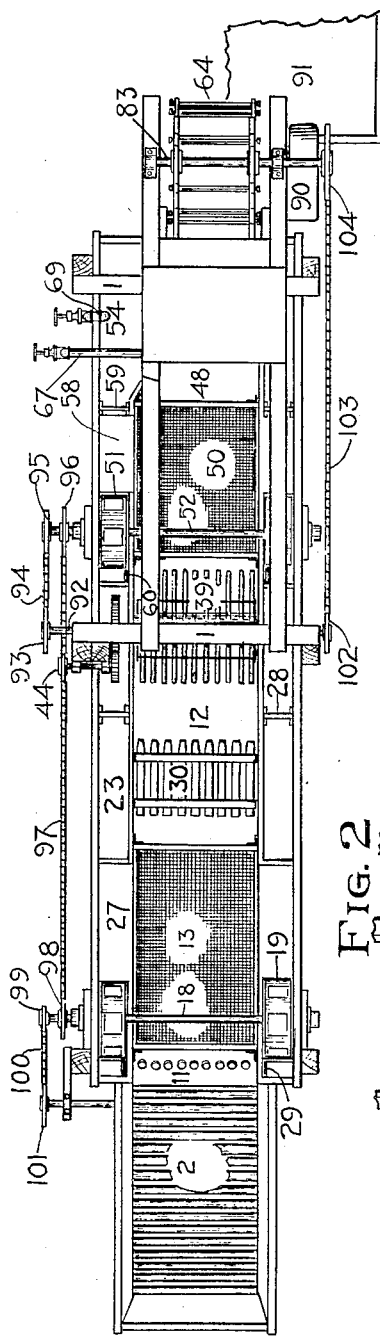
Figure 4:
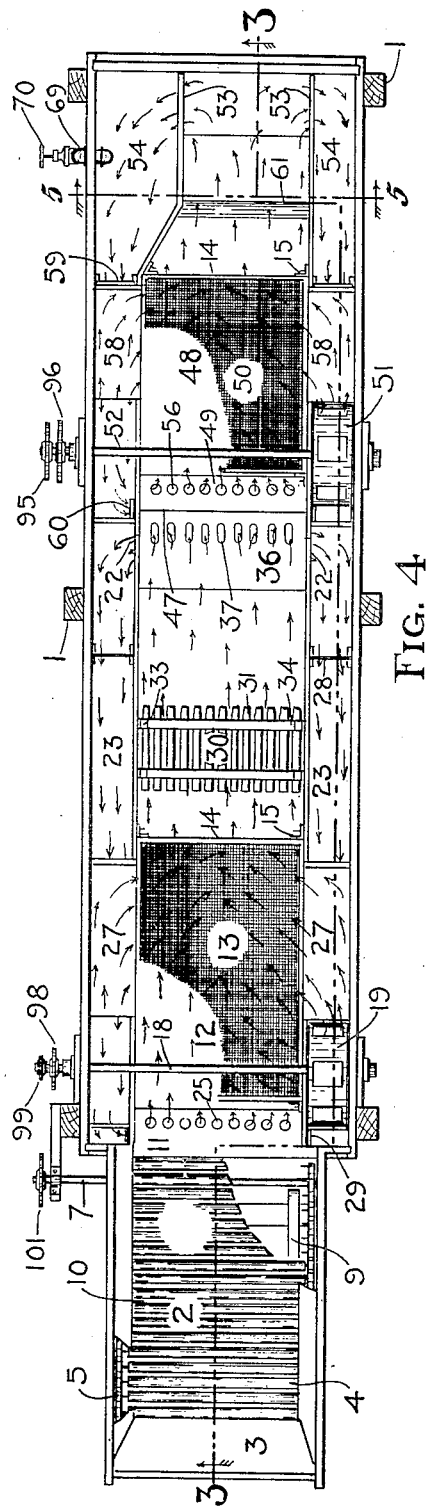
Figure 3:
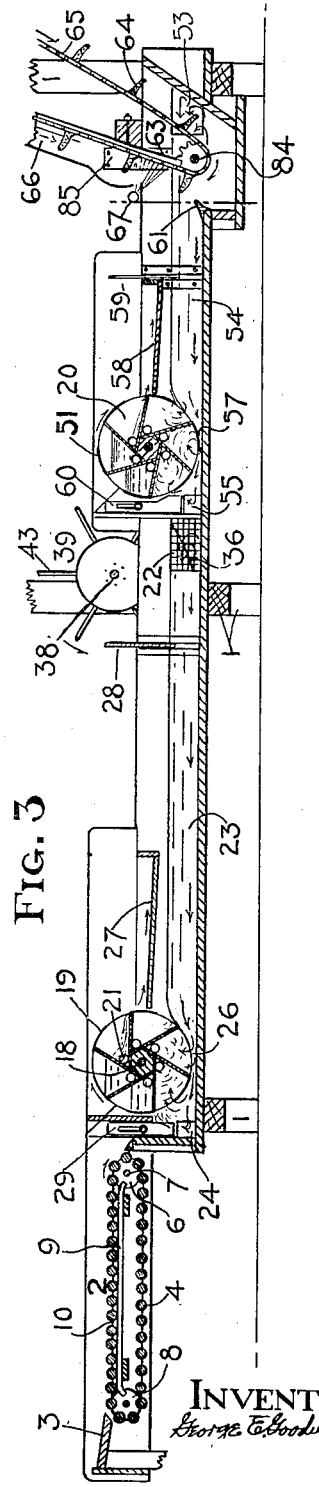

The sheets of drawings which accompany and form a part of these specifications show the mechanism and arrangement thereof for carrying out the invention, and the views illustrating this are as follows: Figure 1 is a longitudinal sectional elevation of the machine, showing a general view of arrangement of parts (including spout 90 in front of section). Figure 2 is a top view of the entire machine; Figure 3 is a vertical longitudinal sectional view on broken line 3—3 (Fig. 4). Figure 4 is a top view of the feed table and tanks (liquid lifting wheels shown in right return ducts only and mechanism at bottom of elevating conveyor and the rake wheel are not shown). Figure 5 is a sectional elevation on line 5—5 (Fig. 4) showing bottom end of elevating conveyor (chains and baskets are omitted), the waste and supply pipes of the rinsing fluid and the liquid circulation. In all of the drawings the direction of rotation or travel of mechanical parts is shown by a single barbed dart; the direction of the liquid flow by a double barbed dart; and the direction of view on section line by a half feathered arrow. The motive power is not shown but it might be electric, gasoline or steam suitably belted or geared to the counter shafts shown. Link belt or chain drives are indicated by broken lines. In the washing tank all metal parts are acid resistant or covered with an acid resistant paint.

The description and functions of the machine and its parts can be more logically brought out by taking them up in the order that the fruit is processed. Reference should be made to the drawings in which the numeral 1 represents the various parts as posts, longitudinal and cross members of a suitable frame for supporting and maintaining in correct position the various parts of the machine. A live roll feed table 2 consisting of an apron board 3 on which the fruit is deposited and from which it rolls upon the suitably side housed conveyor bed, comprised of suitably parallel spaced revolving rolls 4, that rotate upon the pintle of the pintle links positioned at correct intervals and in parallel relationship in the endless link conveyor chains 5 at either side of the feed table. These conveyor chains run over, and are actuated to travel toward the delivery end by, the toothed sprocket 6 attached to revolving shaft 7, also over revolvable sprocket wheels 8. The rollers 4 in their top forward travel position contact with and move over a plural of supporting tracks 9 which impart to them independent rotation upon their pintle bearings causing the leaves and field trash to pass between the rolls through spaces 10 preventing their ingress in the washing tank.

Batter board 11, attached to the receiving end of a suitably shaped and sized washing solution tank 12, receives the fruit from the feed table rolls at a sharp oblique angle imparting a tangential rolling action thereto as it enters the washing liquid, thus wetting all parts of the fruit, and also deflects it under the diffusion screen 13 attached to end rails 14 which are adjustable, as to the distance above the liquid surface, by means of a metal bracket lug 15 attached to each end of the rails, a securing metal pin 16, and a series of vertical positioning holes 17 in the side of the tank.

Suitably mounted on a rotating shaft 18, two liquid circulating and lifting wheels 19, constructed of any suitable materials and of sufficient size, having a plural of pockets 20 with inside side ports 21, draw the washing liquid through grilled ports 22 and return ducts 23, forcing part of it through discharge ports 24 and the several holes 25 in batter board 11, causing a current that floats the fruit under diffusion screen 13, suitable space 26 being left under the wheels 19 for such circulation supply. These wheels revolving between close fitting side housings, the major part of the liquid is raised in pockets 20 to the top quadrant position, where the inside housing is cut away, and some of the liquid is discharged through the side ports 21 on to that end of the diffusing screen, the greater part being carried further in the revolution and discharged on the splay board 27, where it is spread and caused to flow quite evenly over the diffusion screen 13 and drenches down upon the fruit floating thereunder.

Diffusion screen 13 covering a substantial part of washing tank 12 is of such sized mesh or perforations as to cause the liquid discharged thereon to practically cover the entire area before it all passes through the openings, and is attached to suitable end rails 14 (which restrain the liquid at the ends) with a slight sag along the center line and a slope longitudinally which assists in the liquid spreading evenly and drenching all the fruit. Being adjustable as to height the delivery end of the screen may be lowered to contact with the floating fruit, causing it to turn in the liquid.

The capacity of the liquid lifting and circulating wheels being greatly in excess of requirements, the amount of liquid supplied for drenching and the correct flotation speed is controlled by vertically adjustable flow dampers 28, positioned in ducts 23, and the flotation speed is further regulated by similar dampers 29, on discharge port 24, which gives easy and close control of the washing period.

Positioned transversely of the tank, between the diffusion screen and the rake, is submerger 30, that submerges and turns the fruit in the liquid as it is surged forward by the currents under the plural of longitudinal slats or fingers 31 attached to cross rails 34, all of suitable materials and size and spacing, which fingers are positioned at an inclination with the liquid surface so that the fruit readily floats under the receiving end and is barely submerged at the delivery end. The height above the water surface and the inclination thereto being regulated by means of a metal pin 32 being passed through a suitable hole in one leg of a metal bracket lug 33 attached to each end of cross rails 34 and extending into one of a vertical series of positioning holes in the sides of the tank.

Secured to the bottom and delivery end of, and extending transversely across, tank 12 is a concave formed metal sheet 36 having a plurality of slots 37 through which the circulating currents pass and draw the floating fruit within reach of rake wheel 39.

Attached to suitably positioned rotatable shaft 38 is rake wheel 39 consisting of hub 40 and attached hub plates 41 to which are secured a plural of finger bars 42 having a plurality of suitably sized and spaced holes in which are secured the rake fingers 43 extending radially from the sockets in the hub to the length required. Power applied to sprocket 44 transmitted through pinion (no. not shown) and gear (no. not shown) attached to shaft 38 will cause the revolution of wheel 39 in the direction indicated and the slowly moving fingers 43 will remove the fruit from the washing solution sliding it over the surface of concave 36 (the washing liquid draining off the fruit in the meantime) and over the lip 47 of the concave into a suitable sized and shaped tank 48 containing the rinsing fluid.

A batter board 49 attached to the receiving end of the rinsing tank 48 receives the fruit from lip 47 obliquely, imparting a tangential rotation to it as it enters the rinsing liquid, wetting all parts and at the same time the fruit is deflected under the diffusion screen 50 (like screen 13) where it is drenched by the rinsing fluid discharged from two liquid circulating and lifting wheels 51 (like 19) attached to revolving shaft 52, that draw the rinsing liquids through ports 53 and return ducts 54, forcing part of it through discharge ports 55 and through the several suitable holes 56 in batter board 49, causing currents that float the fruit under the diffusion screen toward the elevating conveyor, suitable space 57 being left under wheels 51 for such circulation supply. The wheels revolving between close fitting side housing, the greater part of the liquid drawn through ducts 54 is lifted in pockets 20 to the top quadrant position of the wheel where the inside housing is cut away, and part of the fluid is discharged upon that end of the diffusion screen through the side ports 21, the most of the liquid being carried further in the revolution and discharged upon splay boards 58, from which it spreads over the diffusion screen and is drenched upon the floating fruit.

Positioned so as to receive the liquid discharged from the side ports 21, and runoff from splay boards 58, diffusion screen 50 (like screen 13) covering a considerable part of the rinsing tank has end rails, slope and vertical adjustment like screen 13 and with the rinsing liquid functions as does screen 13 with the washing liquid.

The liquid circulating and lifting capacity of wheels 51 being greater than required, the liquid drawn for drenching and the correct flotation speed is controlled by adjustable flow dampers 59 situated in ducts 54 and operating in vertical ways, and the flotation speed is further regulated by similar dampers 60 on discharge ports 55. By the manipulation of these dampers easy and close control of the flotation period is secured.

In the larger machines having larger size rinsing tanks, a submerger like 30 is so positioned between the screen 50 and elevator 65 so as to force the fruit beneath the liquid as it is rolled and floated along by the surging current; but such submerger is not shown in the size of machine drawn.

Secured in transverse cross member 62 are a plurality of small, closely spaced metal grill bars 63 which extend slightly below the surface of the liquid and serve to restrain the fruit, (which is floated against them by the circulating liquid passing between the bars and through ports 53) where it is held until picked up by the upward moving conveyor baskets 64 of endless chain belt elevator 65 forming a part of conveyor 66.

A well, extending below the bottom of the rinsing tank, affords room for the sweep of the baskets as the chain passes around the bottom sprockets 84 and by use of the deflector lip 61, attached to the front end of the well, the currents set up by the baskets sweeping around the bottom sprockets are so directed as to assist in floating the fruit against the restraining bars 63.

Positioned transversely and horizontally a short distance in front of the elevator is a suitably sized rinsing supply pipe 67 provided with a plural of spray orifices which direct the fresh liquid upon the fruit in the baskets 64 as it leaves the liquids in the tank, and thus further cleaning it after it leaves the rinsing tank. The incoming spray also maintaining the required rate of supply for the rinsing tank, being regulated by valve 68. Suitably positioned in return duct 54 is overflow pipe 69 maintaining the elevation of the liquid level in the rinsing tank, additional regulation thereof being obtained by use of valve 70.

A housing having suitable side members 71, to which is attached a metal back 72 and a removable front cover 73, and open at the top and bottom end through which the endless chain conveyor, having attached fruit carrying baskets 64, moves in the upward travel direction constitutes the fruit removing conveyor 66. This housing secured by brackets 75 to cross member 62 at the bottom end, and to the frame 1 at the top end, is, in the longitudinal plane inclined at some suitable angle from the vertical which will permit the ready discharge of the fruit from the baskets and thence onto any conveyor, sorting table or the like 91 through spouting so arranged. It being evident that the discharge of the fruit is readily changed to either the right or left of the machine.

To effect the above described or pending mechanical functions, power of sufficient amount and of correct tangential speed and direction is applied to revolvable counter shaft 92 mounted on suitable bearings attached to frame 1. Driven from sprocket 93 keyed to revolving counter shaft 92, link belt chain 94 runs over keyed sprocket 95 revolving shaft 52 and liquid circulating and lifting wheels 51 attached thereto. Sprocket 96 keyed to revolving shaft 52 drives chain 97 running over sprocket 44 and actuates the gear driving revolving rake wheel 39. Chain 97 also running over sprocket 98 keyed to shaft 18 revolves the shaft and liquid circulating and lifting wheels 19 attached thereto. Keyed sprocket 99 on revolving shaft 18 drives through chain 100 keyed sprocket 101 rotating shaft 7, operating feed table 2. Attached to counter shaft 92 sprocket 102 through chain 103 drives keyed sprocket 104 revolving head shaft 83 and running elevator 65.

It will be readily seen from the above description that a flotation type fruit cleaning machine with the improvements set forth possesses many advantages not found in machines heretofore invented, some of which are: A small amount of washing solution that is in constant agitation; all areas of the fruit being constantly subjected to drenching and immersion in the liquids; Drainage of the washing liquids from the fruit prior to its introduction in the rinsing liquid; A close and easy control of the washing or rinsing period; A fruit cleaning machine that may be built at a small cost and operated with much less power than other machines of similar capacity for cleaning fruit.

I am aware that there has been manufactured and used and there are still in use, and possibly patented, several forms of fruit washing and drying machines of the float and of the jet method of washing. I, therefore, do not claim the invention of the simple float method; but as new inventions

I claim:

1. In a fruit cleaning machine, a pair of tanks, one containing washing liquid and the other a rinsing liquid, a screen member horizontally positioned over the liquid in said tanks, means for delivering fruit into said tanks over a transversely positioned batter board that rotates the fruit and projects the fruit beneath said screen, a splay board so positioned longitudinally adjacent of said screen as to discharge thereupon, a wheel means mounted in alignment with said splay board and positioned to extend into the liquid and discharge it upon the splay board and adjacent screen, a submerger positioned transversely across the tank back of said screen, a revolving member positioned adjacent to the discharge end of the washing tank that transfers the fruit to the rinsing tank, and a means of removing the fruit at the discharge end of the rinsing tank.

2. In a fruit cleaning machine, the combination of a washing and rinsing tank and treating solutions contained therein, a means for delivering the fruit to the washing tank and of imparting tangential rotation to it as it enters said tank, a screen member horizontally positioned and adjacent to entrance end of said tanks, a splay board positioned longitudinally adjacent of said screen, a revolving wheel with a plurality of liquid lifting pockets with circumferential and side discharge openings, said wheel being so mounted as to draw the liquids from and through return liquid supply ducts and discharge them upon the said screen and splay board, an adjustable submerger transversely positioned back of said screen, a revolving member mounted adjacent to discharge end of the washing tank that transfers the fruit to the rinsing tank, and a conveyor positioned at the discharge end of the rinsing tank which removes the fruit therefrom.

3. In a fruit cleaning machine a pair of tanks containing the washing and rinsing liquids, a means for delivering the fruit into said tanks over a transversely positioned batter board, an adjustable screen member horizontally positioned above the liquid adjacent to the receiving end of said tanks which receives, diffuses and precipitates the liquid discharged thereon upon the fruit passing thereunder, a splay board longitudinally positioned adjacent to said screen, a wheel means mounted in alignment with said splay board and adjacent to said screen and discharging liquids on said screen and splay board, regulatable return liquid ducts for supplying said wheels, a submerger member transversely positioned back of said screen, a revolving means for transferring the fruit from the discharge end of the washing tank to the rinsing tank, a conveyor for removing the fruit from the discharge end of the rinsing tank.

4. In a fruit cleaning machine as described, the combination of a washing and a rinsing tank with liquids contained therein, a means for delivering fruit to said washing tank, batter boards at the entrance end of said tanks over which the fruit rolls, a horizontal screen positioned over the liquids and adjacent to the entrance end of said tanks, a wheel means mounted adjacent to said screen and positioned to withdraw the liquid from a regulatable return supply duct and discharge it over said screen, a return supply duct extending from the discharge end of said tanks to the wheel pit and conveying the circulating and precipitating liquids therethrough and equipped with flow regulating dampers that control the flow and the division of liquids therein and the rate of flotation and processing of the fruit, a submerging member transversely positioned back of said screen, a revolving member that transfers the fruit from the discharge end of the washing tank to the rinsing tank, and a conveyor that removes the fruit from the discharge end of the rinsing tank.

5. In a fruit cleaning machine the combination of a pair of tanks containing washing and rinsing liquids, batter boards for imparting rotation to the fruit entering said washing tank, a screen member horizontally positioned over the liquid and adjacent to the receiving end of said tanks, a longitudinal positioned splay board at side of said screen, a regulatable return supply duct, a wheel member that draws the liquid therefrom and discharges same upon the said screen and splay boards, an adjustable submerger positioned back of said screen comprised of substantially horizontal transverse members with a plural of longitudinal and parallel fingers that engage the fruit and submerse and turn it in the liquid, a means of transferring the fruit from the washing to the rinsing tank and a conveyor positioned at the discharge end of said rinsing tank for removing said fruit.

6. In a fruit cleaning machine, comprising a pair of tanks containing washing and rinsing liquids, batter boards at the entrance end of the tanks over which the entering fruit rolls, a screen member horizontally positioned over the liquids adjacent the entrance end of said tanks, a splay board so positioned longitudinally to said screen as to discharge thereon, a wheel means mounted adjacent to said screen and in alignment with said splay board and to extend into the liquids and effective to withdraw the liquids and discharge same upon said splay board and screen, a regulatable return liquid supply duct to said wheels, a transversely positioned submerger back of said screen, a revolving member positioned adjacent to the outlet end of the washing tank including rake elements to engage the fruit and transfer it over a concaved drainage surface into the rinsing tank, and a discharging conveyor installed adjacent to the discharge end of the rinsing tank.

7. In a fruit cleaning machine the combination of a pair of tanks containing the washing and rinsing liquids, a horizontal screen member positioned over the liquids and adjacent to the receiving end of said tanks, a means of delivering the fruit to said washing tank, a batter board positioned across the entrance end and in front of the screen in said tanks, a splay board positioned longitudinally with and adjacent to said screen so as to discharge thereon, a wheel device mounted in alignment with said splay board and extending into the liquids in the liquid return ducts, a submerger transversely positioned across the tank back of said screen, a regulatable return liquid supply duct for conveying the liquids from the discharge end of tanks to said wheel, a concaved drainage surface positioned at outlet end of washing tank and approximately tangential to rotatable rake elements the lower portion thereof having openings to the return supply ducts, a rotatable rake means of transferring the fruit from the washing to the rinsing tank over said drainage surface, and a means for removing the fruit from the rinsing tank.

GEORGE E. GOODWIN.